United States Patent
Streichenberger

(12) 
(10) Patent No.: US 6,325,569 B1
(45) Date of Patent: Dec. 4, 2001

(54) CULTIVATING KELP AND MUSSELS TOGETHER

(76) Inventor: Rodolphe Streichenberger, 75 Sea Island Dr., Newport Beach, CA (US) 92660

( * ) Notice: Subject to any disclaimer, the term of this patent is extended or adjusted under 35 U.S.C. 154(b) by 0 days.

(21) Appl. No.: 09/434,504

(22) Filed: Nov. 5, 1999

(51) Int. Cl.$^7$ ............................... E02B 3/00; A01K 61/00
(52) U.S. Cl. ............................................. 405/24; 119/221
(58) Field of Search .................................. 405/24, 21, 15, 405/25, 23, 28, 29; 119/200, 204, 207, 208, 209, 221

(56) References Cited

U.S. PATENT DOCUMENTS

| | | | |
|---|---|---|---|
| 4,130,994 | * | 12/1978 | Van Moss, Jr. ........................ 405/24 |
| 4,337,007 | * | 6/1982 | Smith ..................... 405/24 |
| 4,657,432 | * | 4/1987 | Rentrop et al. ......................... 405/24 |
| 4,872,782 | * | 10/1989 | Streichenberger ...................... 405/24 |
| 4,950,104 | * | 8/1990 | Streichenberger ...................... 405/24 |
| 5,309,672 | * | 5/1994 | Spencer et al. .......................... 405/24 |
| 5,884,585 | * | 3/1999 | Streichenberger ................... 119/221 |
| 6,056,476 | * | 5/2000 | Streichenberger ..................... 405/24 |

FOREIGN PATENT DOCUMENTS

| | | | |
|---|---|---|---|
| 63-293215 | * | 11/1988 | (JP) ........................................ 405/24 |
| 4-146313 | * | 5/1992 | (JP) ........................................ 405/24 |
| 85/03539 | * | 8/1985 | (WO) ..................................... 405/24 |

* cited by examiner

*Primary Examiner*—David Bagnell
*Assistant Examiner*—Frederick L. Lagman

(57) ABSTRACT

An artificial marine habitat made of seaweed affixed near-off bottom on buoyant ropes (10) and shellfish affixed near-off bottom on racks (26) whereby the symbiosis of seaweed and shellfish produces a synergic effect resulting in increased diversification and production of marine species inhabiting this habitat. If ropes (10) are colonized by unwanted shellfish they fall on the water bottom where these shellfish are eliminated by bottom predators. If racks (26) are colonized by unwanted seaweed, this seaweed is eliminated through the shellfish competition incited by the aquaculturist which on these racks installs already-mussel-colonized ropes (10). The man-made marine habitat gives new shelter, food, and reproductive ground to marine wildlife and is a prime place for aquacultural and recreational activities.

1 Claim, 2 Drawing Sheets

Figure 1:
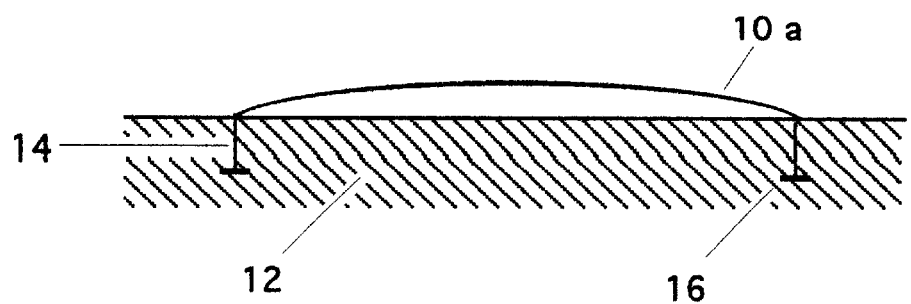

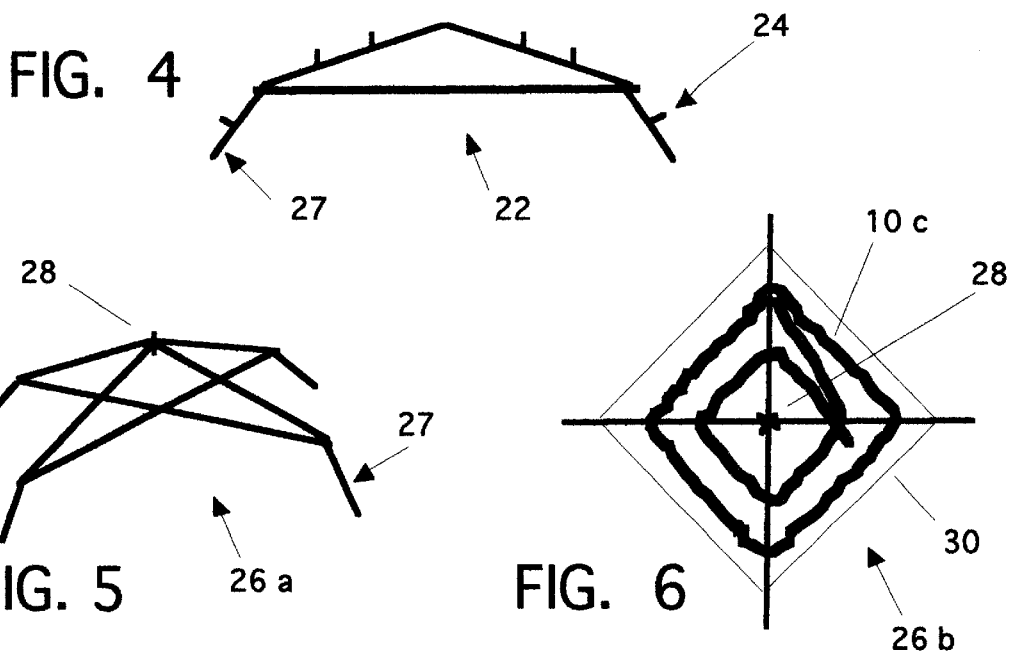
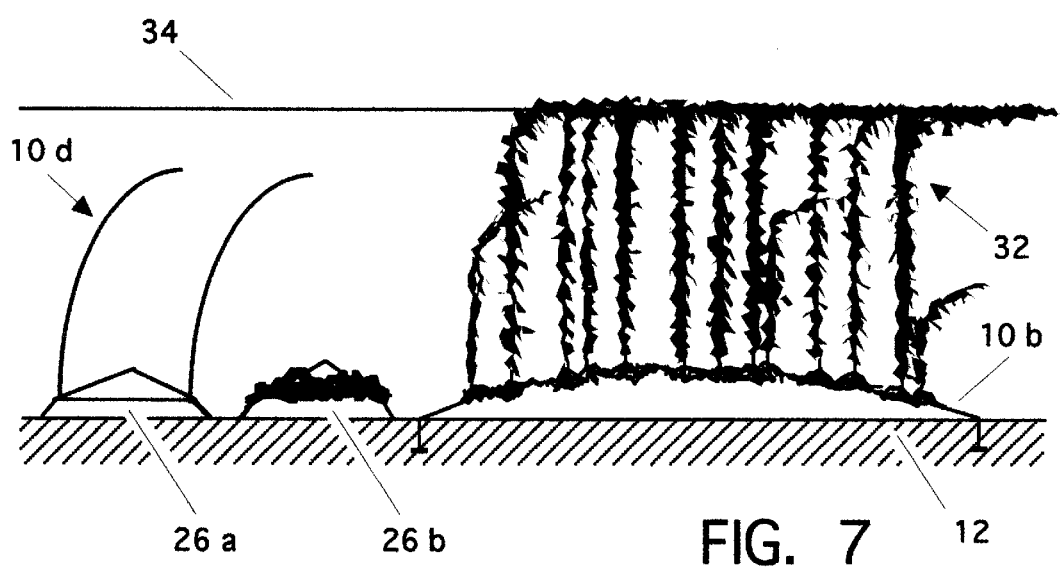

CULTIVATING KELP AND MUSSELS TOGETHER

BACKGROUND

1. Field of invention

This invention relates to the cultivation of seaweed and shellfish for the creation and exploitation of aquatic habitats.

2. Discussion of Prior Art

The creation of new aquatic habitats to compensate for man-caused losses of natural habitats is in great demand. The plantation of kelp forests and shellfish reefs have been proposed to replace fish shelter, food, and spawning grounds which are depleted. Also, the aquacultural exploitation of these man-made habitats has been proposed in order to make their construction profitable for the private investor. In my patent U.S. Pat. No. 4,872,782 of Oct. 10, 1989 and in my patent U.S. Pat. No. 5,884,585 of Mar. 23, 1999 I proposed artificial substrates for the construction of mussel habitats, and in patent application Ser. No. 09/206/276 now U.S. Pat. No. 6,656,476 filed on Jun. 23d, 1998 I proposed artificial substrates for the plantation of kelp forests. Also, some aqualculturists cultivate shellfish in mesh bags placed on intertidal racks to prevent predation from bottom organisms.

Nevertheless, I recognized the difficulty to cultivate in the same marine habitat kelp and mussels together. Mussels colonize kelp substrates and kelp colonizes mussel substrates. However, I wanted to create an habitat with both mussels and kelp, because in the California sea these two remarkable marine organisms are complementary, and cultivated in symbiosis have a synergic effect resulting in greater diversity and production of marine species. Mussels and kelp can live well together as long as substrates are available for both species. Mussels and kelp do not compete in the food chain. Phytoplankton feeds mussels which feed carnivorous fish. Dissolved nutrients feed kelp which feeds herbivorous fish. Mussels and kelp compete only for their fixation on solid substrates which often are rare. The Prior Art did not solve the problem of shellfish and seaweed competing with each other for limited substrates, and as a result limiting the diversity and productivity of marine habitats.

OBJECTS AND ADVANTAGES

Accordingly, besides the objects and advantages of the kelp and mussel habitats described in my above-mentioned inventions, several advantages of the present invention are:
(a) to provide an aquatic habitat with kelp and mussels living together;
(b) to provide a synergic effect increasing marine life;
(c) to provide removable buoyant ropes for the recruitment of kelp embryos;
(d) to provide removable buoyant ropes for the cultivation of kelp;
(e) to provide self-cleaning buoyant ropes for the cultivation of kelp;
(f) to provide buoyant ropes for the recruitment of mussel embryos;
(g) to provide removable racks for the cultivation of mussels.

Further objects and advantages are in the possibility of recruiting in the same habitat species of seaweed other than kelp and species of shellfish other than mussels. Further objects and advantages will become apparent from a consideration of the ensuing descriptions and drawings.

DRAWING FIGURES

Figure 2:
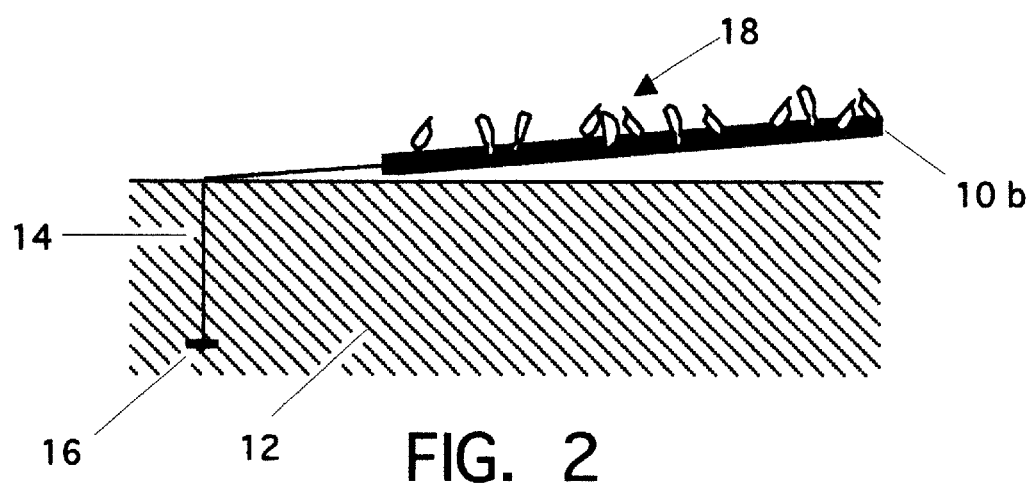
Figure 3:
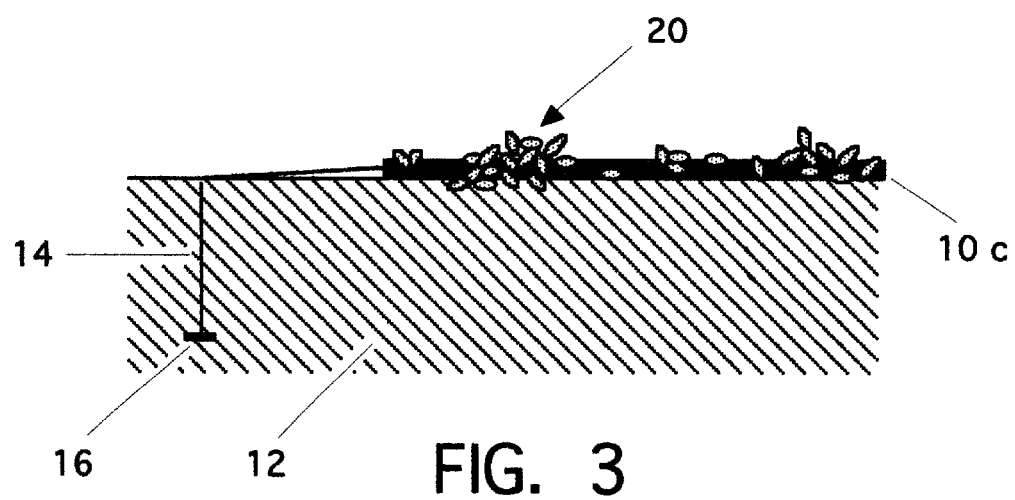

FIG. 1 shows a buoyant rope for kelp recruitment.
FIG. 2 shows juvenile kelp on a rope.
FIG. 3 shows mussels on a rope.
FIG. 4 shows one frame for a rack.
FIG. 5 shows two frames forming a rack.
FIG. 6 shows a rack with mussels.
FIG. 7 shows a marine habitat.

REFERENCE NUMERALS IN DRAWINGS

| | |
|---|---|
| 10 a. | rope |
| 10 b. | rope with kelp |
| 10 c. | rope with mussels |
| 10 d. | rope to recruit mussel spats |
| 12 | sandy bottom |
| 14 | moorings |
| 16 | buried anchors |
| 18 | juvenile kelp |
| 20 | mussels |
| 22 | frame for a rack |
| 24 | angle-blocks |
| 26 a | rack without mussels |
| 26 b | rack with mussels |
| 27 | rack legs |
| 28 | fastener |
| 30 | tension line |
| 32 | adult kelp |
| 34 | water surface |

SUMMARY

A combination of old and new features to increase diversity and productivity in aquatic habitats wherein seaweed and shellfish compete for solid substrates on which to affix.

DESCRIPTION—FIGS. 1 to 6

FIG. 1 shows a thick rope 10a for the cultivation of giant kelp Macrocystis pyrifera. Rope 10a is made of a buoyant material, such as polypropylene, and it floats above a sandy water bottom 12. For example, rope 10a has a thickness of 40 mm. and a length of 12 m. At both ends rope 10a is anchored by moorings 14 and anchors 16 which have been buried by a water jet.

FIG. 2 shows rope 10b floating above sandy bottom 12 with newly recruited juvenile kelp 18.

FIG. 3 shows a rope 10c lying on sandy bottom 12 after being colonized by mussels 20.

FIG. 4 shows a frame 22 made of 15 mm. diam. rebars. The upper part of the frame forms a triangle. The lower part of the frame consists of legs 27. Angle-blocks 24 made of 10 mm. diam. rebars have been welded to frame 22.

FIG. 5 shows how two frames 22 make a rack 26a one frame 22 being forced perpendicularly inside another frame 22 and the two frames being bound at their summit by a fastener 28.

FIG. 6 shows from above a mussel-colonized rope 10c coiled around rack 26b and hooked by angle-blocks 24 (FIG. 4). At the foot of rack 26b and hooked on the lower angle-blocks 24 is a tension line 30 which maintains the quadrature of frames 22 forming rack 26a.

FIG. 7 shows a marine habitat with mussels and kelp together. Giant kelp 32 affixed on rope 10b rises above sandy bottom 12 up to the water surface 34. Mussels 20 grow above sandy bottom 12 on rack 26b. Two mussel spat-recruiting ropes 10d, which are buoyant, float vertically in the water column and are anchored on rack 26a.

OPERATION OF INVENTION

For cultivating Kelp, as shown in FIGS. 2 and 7, buoyant ropes 10b, such as for example 40 mm. diam., 12 m. long polypropylene ropes, are moored by their two ends on a soft bottom sediment. Preferably, moorings and anchors are water-jetted into the sediment 2 m. or more deep, according to the technique already described by the same author in U.S. Pat. No. 4,872,782.

If conditions of nature are favorable, kelp sporophytes will recruit naturally, and juvenile kelp will develop on rope 10b off bottom and spared from bottom predators, as shown in FIG. 2. If natural conditions are less favorable kelp development can be artificially promoted by wrapping around rope 10b a line which has been pre-seeded with kelp sporophytes, according to the technique already described by the same author in patent application Ser. No. 09/206, 276. When kelp development occurs the natural buoyancy given by the gas-filled cysts of the kelp plant will add to the buoyancy of polypropylene rope 10b which will strongly rise above sand level.

However, kelp development on all ropes 10 can be prevented by an unwanted colonization of mussels 20. Nature itself can decide on the natural settlement of mussels 20 first, before a natural settlement of kelp 18. And, if mussels have settled first kelp will not settle second. Yet, the present invention solves this problem as follows.

All buoyant ropes 10 which happen to be colonized by mussels have no sufficient buoyancy to support the weight of mussels 20. In FIG. 3 is shown rope 10c which has fallen on sandy bottom 12 after being colonized by mussels 20. There, mussels become accessible to bottom predators such as starfish and bat rays which prey heavily on them. Thus, rope 10c will be quickly cleansed from all affixed mussels 20. After rope-cleansing by bottom mussel predators such as starfish and bat rays, buoyant rope 10c will rise again above the sand level, and again will be available for natural or artificial kelp or seaweed recruitment and development, safe from bottom kelp or seaweed predators such as urchins.

The present invention uses ropes which are buoyant, such as polypropylene ropes. Non-buoyant ropes, such as nylon ropes cannot be used because they would lie on the soft bottom wherein they will finally subside and disappear into the sediment's layer. If rope 10c of FIG. 3 were made, for example, of non-buoyant nylon instead of buoyant polypropylene it would disappear into the sand and be no more an available substrate for sessile organisms such as seaweed, kelp, and mussels.

A cost saving embodiment of the invention is to use for the culture of giant kelp small diameter buoyant ropes 10 on which are attached from place to place segments of large diameter polypropylene ropes or polyetylene tubes which are buoyant. These large diameter segments will be enough substrates for the fixation and development of giant kelp 32.

For cultivating mussels, as shown in FIGS. 6 and 7, racks 26 are first dropped on a sedimentary bottom where they stay anchored by their own weight. Racks 26, for example, are each made of two sets of 4.40 m. and 2.80 m. long, 15 mm. diam. rebars which are welded together to form two triangle-like frames 22 (FIG. 4). Six 10 mm diam. rebar-made angle-blocks 24 are welded around frames 22. Two frames 22 are assembled in a perpendicular quadrature by forcing one frame 22 inside the triangle of another frame 22 which forms a pyramid-like rack 26a standing on four 0.70 m. long legs 27 (FIG. 5). The two frames 22 are bound at their summit by a fastener 28 (FIGS. 5 and 6). A tension line 30 (FIG. 6) is attached to the lower angle-blocks 24 to maintain the wanted quadrature of rack 26a and to prevent legs 27 from subsiding more than 0.30 m. into the sediment on which the structure will be installed. Tension line 30 can be replaced by rigid bars. Also, one of the two frames composing rack 26a can be completed with a rebar welded between the two lower angle-blocks 24 to add to prevent the structure from sinking further into the sediment. In FIG. 7 are shown racks 26a and b after their legs 27 have sunk no more than 0.30 m. into the bottom sediment.

However, the natural development of mussels 20 on racks 26 can be compromised by unwanted development of seaweed or kelp. Giant kelp Macrocystis pyrifera has room enough for only one plant to grow on the thin structure of one rack 26, and such a giant plant would be easily eliminated by the aquaculturist. However, nature can decide which other seaweed will first settle on the newly available substrate, and where seaweed has first settled mussel spats will not settle. In order to develop only mussels on racks 26 the present invention solves the problem as follows.

One or two buoyant ropes 10d (FIG. 7), similar to buoyant ropes 10a, b, and c of FIGS. 1, 2, and 3, are attached by one end to rack 26a. As soon as nature decides, mussel spats will colonize ropes 10d which are rising high in the water column. Ropes 10d will not recruit kelp sporophytes because these sporophytes settle near bottom and not high in the water-column. Soon after mussel spat colonization has occurred, buoyant ropes 10d will fall on the water bottom under the weight of juvenile mussels. At this precise time, the aquaculturist install ropes 10d on racks 26a and b. Mussel-colonized ropes 10d are coiled and hooked on angle-blocks 24 onto racks 26a and b where they will be positioned 0.30 m. off bottom, out of the reach of bottom predators. Ropes 10d can be installed onto racks 26a and b over unwanted kelp or sea weed which eventually would have already colonized these racks. Juvenile mussels which are brought in with ropes 10d onto racks 26a and b will affix solidly over pre-settled kelp or seaweed, compete with them, smother them, and prevail. In this inter-species competition against pre-settled kelp or seaweed, juvenile mussels brought in with ropes 10d are strong enough to prevail in a place where mussel spats in their natural search for substrates would not even try to settle. But, once the aquaculturist has installed mussel-colonized ropes 10d on racks 26a and b no kelp or seaweed can compete and prevent the further development of mussels 20.

An important embodiment of the invention is that all racks 26 can be installed on the water bottom by means of a line attached permanently or temporarily to the summit of these racks. Also, for maintenance, harvest, or change of location, the aquaculturist can pull on this line and bring up racks 26, ropes 10, and mussels 20 onto the deck of his boat

CONCLUSION, RAMIFICATION, AND SCOPE OF THE INVENTION

Thus, the reader will see that this invention, which is a combination of old and new features, allows the creation on barren sandy bottoms of new ecosystems inhabited by two of the most productive marine organisms known: kelp and mussels. In the water column a kelp habitat is created and on the water bottom a mussel habitat is created. The two different kinds of species combined produce a synergic effect which results in an unparalleled diversity and production of such species as seaweed, invertebrates, shellfish, crustacea, cephalopodes, sand fish, rock fish, etc . . .

The invention of an artificial habitat of kelp and mussels combined has no equal in nature. Such a marine habitat can rival the productivity of the best ecosystems in the world: rain forests, coral reefs, and mangroves.

On ropes and racks, which are removable substrates, the aquaculturists can cultivate seaweed other than kelp and can cultivate shellfish other than mussels. Also, the aquaculturist can exploit other wild fish and crustacea which will shelter, feed, and reproduce in the full-of-life habitat that he has created on a deserted and barren sedimentary bottom. The habitat is a prime place for fishing and recreational activities.

While my above description contains many specificities, these should not be construed as limitations on the scope of the invention, but rather as an exemplification of one preferred embodiment thereof. Many other variations are possible, for example, all racks 26 can be equipped with segments of plastic pipe to shelter lobsters. Another possibility is to improve the stability of racks under storm by utilizing a segment of buoyant rope 10d to connect two juxtaposed racks 26.

Accordingly, the scope of the invention should be determined not by the embodiments illustrated, but by the appended claims and their legal equivalents.

I claim:

1. A rope made of buoyant synthetic material moored at both ends, deployed near off bottom, on which seaweed which are buoyant can affix and grow out of the reach of bottom predators, and on which unwanted fixation of non-buoyant organisms such as shellfish causes the rope to fall down to the bottom where these unwanted organisms are eliminated by bottom predators, whereby buoyant seaweed can develop and non-buoyant organisms cannot.

\* \* \* \* \*